(12) United States Patent
Rule et al.

(10) Patent No.: US 7,526,364 B2
(45) Date of Patent: Apr. 28, 2009

(54) VIRTUAL FIELD CONTROLLER

(75) Inventors: Thomas Rule, Arlington Heights, IL (US); Mark Maslov, Chicago, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 259 days.

(21) Appl. No.: 11/477,252

(22) Filed: Jun. 29, 2006

(65) Prior Publication Data
US 2006/0247797 A1 Nov. 2, 2006

Related U.S. Application Data

(62) Division of application No. 11/047,360, filed on Jan. 31, 2005.

(60) Provisional application No. 60/540,544, filed on Jan. 30, 2004.

(51) Int. Cl.
*G01M 1/38* (2006.01)
(52) U.S. Cl. ....................................... 700/275
(58) Field of Classification Search ............ 700/65, 700/275, 276, 277, 278, 282
See application file for complete search history.

(56) References Cited

U.S. PATENT DOCUMENTS

| | | | |
|---|---|---|---|
| 5,101,402 A * | 3/1992 | Chiu et al. ............ | 709/224 |
| 6,598,056 B1 * | 7/2003 | Hull et al. ............ | 707/104.1 |
| 6,788,980 B1 * | 9/2004 | Johnson ............ | 700/1 |
| 6,832,120 B1 * | 12/2004 | Frank et al. ............ | 700/65 |
| 6,934,945 B1 * | 8/2005 | Ogilvy ............ | 718/1 |
| 6,978,194 B2 * | 12/2005 | McIlhany et al. ............ | 700/276 |
| 7,110,919 B2 * | 9/2006 | Brindac et al. ............ | 702/188 |

OTHER PUBLICATIONS

DiStefano et al. "A Java Kernel for Embedded Systems in Distributed Process Control", 2000; IEEE pp. 55-63.*
Mahalik et al. "Design and Development of System Level Software Tool for DCS Simulation"; Jan. 9, 2003; Elsevier; pp. 451-465.*
Wewalaarachchi et al. "Remote Real-Time Data Monitoring and Control"; Dec. 27, 2001; World Intellectual Porperty Organization; pp. 1-13.*

* cited by examiner

*Primary Examiner*—Albert DeCady
*Assistant Examiner*—Chad Rapp

(57) ABSTRACT

An arrangement includes a control station for use in a building control system, the building control system having a plurality of field panels operable to communicate with the control station. The control station has a memory and processing circuit that is configured to execute programming instructions in the memory. The memory is configured to store instructions operable to cause the processing circuit to: execute a first operating system; execute software compiled from a set of instructions that are substantially similar to instructions used to compile firmware for at least one of the field panels, the at least one field panel employing a second operating system; and execute software performing at least one supervisory control operation for the plurality of field panels.

22 Claims, 6 Drawing Sheets

VIRTUAL FIELD CONTROLLER

This is a divisional application of U.S. patent application Ser. No. 11/047,360, filed Jan. 31, 2005, which, in turn, claims the benefit of U.S. Provisional Patent Application Ser. No. 60/540,544, filed Jan. 30, 2004, which is incorporated herein by reference.

FIELD OF THE INVENTION

The present invention relates generally to building control systems, and more particularly, to building control systems that include distributed field controller devices.

BACKGROUND OF THE INVENTION

Building control systems are employed to regulate and control various environmental and safety aspects of commercial, industrial and residential facilities (hereinafter referred to as "buildings"). In ordinary single-family residences, control systems tend to be simple and largely unintegrated. However, in large buildings, building control systems often consist of multiple, integrated subsystems employing hundreds of elements.

For example, a heating, ventilation and air-conditioning ("HVAC") building control system interrelates small, local control loops with larger control loops to coordinate the delivery of heat, vented air, and chilled air to various locations throughout a large building. Local control systems, for example, open and close vents that supply heated or chilled air based on local room temperature readings. Larger control loops, for example, obtain many distributed temperature readings and/or air flow readings to control the speed of a ventilation fan, or control the operation of heating or chilling equipment.

As a consequence of the interrelationship of these control loops, many elements of a building control system must communicate information to each other. To this end, communication networks have been incorporated that transmit digital data between and among the various elements in accordance with one or more sets of protocols.

Some of the core elements of a sophisticated building control system include field controller devices, supervisory control stations, plant equipment, sensors and actuators. Sensors and actuators constitute the terminal devices of the building control system. Sensors measure and/or collect raw data regarding the system, and actuators physically change the output of the system. Sensors may include, for example, temperature sensors, humidity sensors, air flow sensors and the like. Actuators may include, for example, devices that alter fan speed, alter the position of ventilation shaft dampers, or alter the flow of hot water through heating pipes.

Field controllers, sometimes referred to as field panels, are distributed control units that in large part control the operation of the system, at least in localized areas of the building. To this end, field panels or controllers may receive sensor signals from the sensors and provide control signals to one or more actuators. The field panel devices generate such control signals based on the sensor signals and other control signals. The other control signals can be set point values received from other field panel devices and/or the supervisory work station.

As is known in the art, a field controller is typically a wall-mounted housing that includes multiple I/O sockets or terminals for connecting to actuators, sensors and smaller subsystems. The field controller also includes processing circuitry and memory. The field controller processing circuitry runs firmware that is specially adapted to the physical configuration of the field panel. Various field panels of this type are commercially available. One such field panel or field controller or field controller is the MEC controller available from Siemens Building Technologies, Inc. of Buffalo Grove, Ill. Historically, field controllers are mounted on a wall near the location in which the sensors and actuators are installed.

The supervisory work station is typically a general purpose computer having a human user interface that allows for human technicians to monitor and control overall system operation. The supervisory work stations operate more as a data server that can access certain types of data from the field controllers, and allow user input of certain set points and control output values. The supervisory work stations typically include a computer work station host having at least the elements of an ordinary personal computer. An example of a building control system work station is the INSIGHT.™. brand work station available from Siemens Building Technologies, Inc. of Buffalo Grove, Ill.

In such building control systems, the field controller devices are generally connected to each other as well as to the one or more supervisory work stations in order to share information necessary for coherent building control.

The above described architecture is effective and has been widely implemented. However, this architecture has some drawbacks. One such drawback is that the field controllers can be difficult or at least inconvenient to test and demonstrate. Because of the specialized nature of the field controller hardware, an actual working field controller must be employed to demonstrate the functionality of the field controller and to test new functionalities of the field controller. Working field controllers are not always conveniently available.

There is a need, therefore, for a building control system that reduces the need for working field controllers for at least some limited uses.

SUMMARY OF THE INVENTION

The present invention addresses the above needs, as well as others, by providing a virtual field controller that operates within a general purpose computing environment. The virtual field controller consists of software having much of the same functionality and architecture as the software or firmware of physical field controllers used in the same building control system. Thus, new developments to field controller functionality may be tested and/or demonstrated on the virtual field controller, which may reside on any general purpose computer, instead of requiring a working physical field controller.

A first embodiment of the invention is an arrangement comprising a first computer having a first operating system, the first computer having a memory containing software derived from field controller software executed on physical field controllers of a building control system. The physical field controllers employ a second operating system. The software further contains an operating system abstraction layer operable to convert at least some operating system calls of the field controller software to corresponding calls in the first operating system.

The above described embodiment allows for a general purpose computer to operate at least a part of the software or firmware used in a physical field controller. The operating system abstraction layer causes operating system calls in the physical field controller to be made in a manner that is understood by the operating system of the general purpose computer.

Another embodiment of the invention is an arrangement for use in a building control system that includes a plurality of field controllers and a computer workstation. Each of the plurality of field controllers is operably connected to at least one sensor and/or at least one actuator of a building control system. Each field controller includes a first set of programming instructions operable to generate an actuator control value based at least in part on signals directly or indirectly received from one or more of the at least one sensors, and a second set of programming instructions operable to process sensor data to generate information other than actuator control values. The computer work station includes a general purpose computer, and further includes a third set of programming instructions operable to perform data interface functions for data generated by the plurality of field controllers. The computer work station also includes a fourth set of programming instructions operable to perform the functions of the second set of programming instructions.

The above described features and advantages, as well as others, will become more readily apparent to those of ordinary skill in the art by reference to the following detailed description and accompanying drawings.

DETAILED DESCRIPTION

Figure 1:
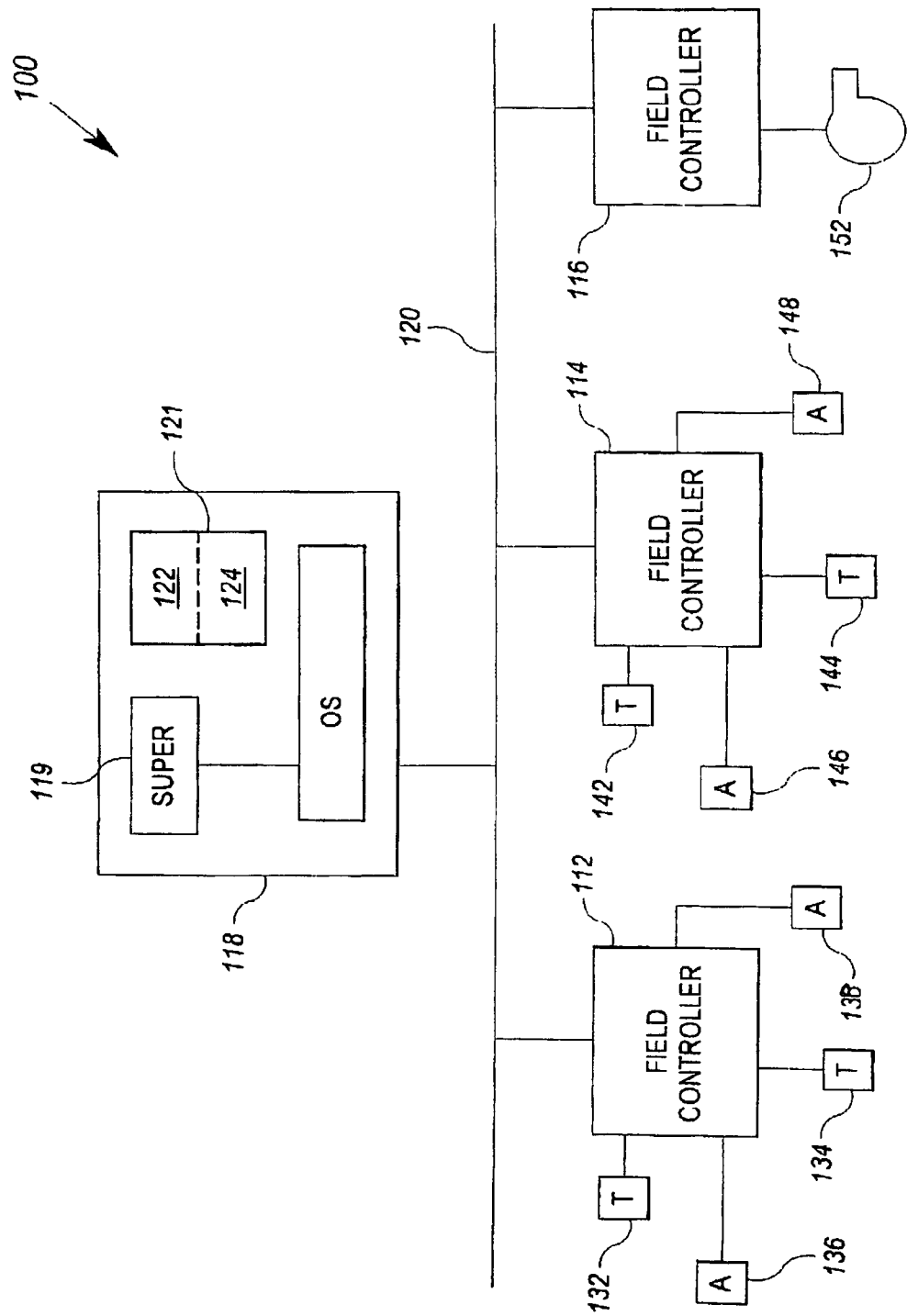
FIG. 1 shows a schematic block diagram of an exemplary building control system that incorporates aspects of the invention.

FIG. 1 shows a block diagram of an exemplary system 100 that incorporates an embodiment of the invention. The system 100 comprises a building control system having three field panels or field controllers 112, 114 and 116, and a computer workstation 118 connected by a building network 120. Each of the field controllers 112, 114 and 116 is operably connected to one or more sensor devices and/or actuators, discussed below. At least some of the field controllers 112, 114 and 116 are operable to generate control signals that cause output to physical devices (i.e. actuators) based at least in part on input from one or more sensor devices. In general, the field controllers 112, 114 and 116 share building control data with each other and with the computer workstation 118. In other words, the field controller 112 can request and obtain certain data from the field controller 114 over the building level network 120. Field controllers having the general operations discussed above are well known in the art.

While the field controllers 112, 114 and 116 and the work station 118 may be used in any building system, including fire safety systems and security systems, the exemplary embodiment described herein will be presumed to be a heating ventilation and air conditioning ("HVAC") system.

Figure 2:
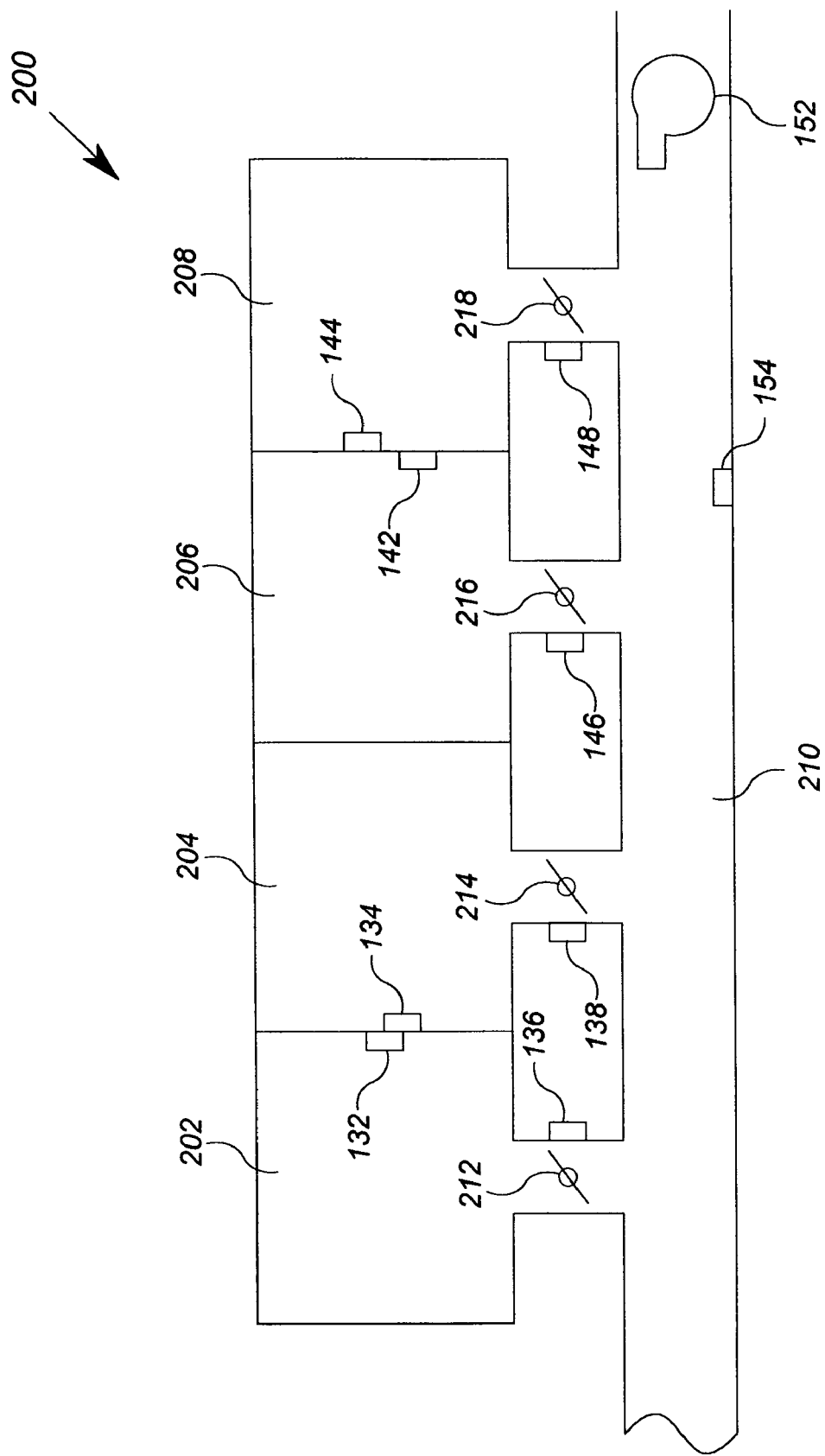
FIG. 2 shows a mechanical schematic diagram of a portion of an exemplary building in which the building control system of FIG. 1 is implemented.

FIG. 2 shows a mechanical drawing of a portion of an exemplary building that may employ the building control system 100 of FIG. 1. The building 200 includes four rooms or zones 202, 204, 206 and 208. Each zone includes a temperature sensor, such that the zone 202 includes a temperature sensor 132, the zone 204 includes a temperature sensor 134, the zone 206 includes a temperature sensor 142, and the zone 208 includes a temperature sensor 144. Temperature can be controlled at least in part by delivery of cool air to the zones 202, 204, 206 and 208. To this end, a ventilation shaft 210 provides cool air in the vicinity of the zones 202, 204, 206 and 208. Ventilation dampers 212, 214, 216 and 218 control the flow of air into, respectively, the zones 202, 204, 206 and 208 from the shaft 210. To open or close the ventilation dampers 212, 214, 216 and 218, respective actuators 136, 138, 146 and 148 are provided. A blower 152 controls the overall flow of air within the shaft 210. A flow sensor 154 is located within the shaft 210 to detect the air flow therein. The field controllers 112, 114, 116 and the work station 118 and are not shown in FIG. 2, but are electrically connected to the devices of FIG. 2 as shown in FIG. 1.

Referring again to FIG. 1, the field controller 112 is configured to receive two temperature values from the two temperature sensors 132 and 134. The field controller 112 is also configured to generate control output values in the form of signals to the two ventilation damper actuators 136 and 138. Similarly, the field controller 114 is configured to receive two temperature values from the two temperature sensors 142 and 144, and is configured to generate control outputs to the two ventilation dampers 146 and 148. As shown in FIG. 2, each of the temperature sensors 132, 134, 142 and 144 is located in a different area or zone of the building 200 in which the temperature is being monitored. The ventilation damper actuators 136, 138, 146 and 148 control, respectively, the dampers 212, 214, 216 and 218 that are located in ventilation feed shafts that provide air flow into different areas or zones of the building, and thus regulate the flow of cool (or warm) air into those zones.

In contrast to the field controllers 112 and 114, the field controller 116 is configured to control the blower 152 within the ventilation shaft 210. To this end, the blower 152 includes one or more actuators that can alter its physical operation. The blower 152 operates to at least partially control the overall flow of air to the shaft 210 that feeds the ventilation dampers 212, 214, 216 and 218. The field controller 116 also includes a sensor input from the air flow sensor 154.

Each of the field controllers 112, 114 and 116 may suitably have the architecture and structure of a prior art field controller such as the MEC controller available from Siemens Building Technologies, Inc. In addition to I/O circuitry for sensor and actuators, each of the field controllers 112, 114 and 116 has one or more processors operable to perform a number of software functions. Such software functions include an operating system environment, a communications software function, a data management function, control application functions, and optionally advanced services application functions. Preferably, each of the field controllers 112, 114 and 116 includes software for several of these functions derived from substantially the same source code. In many cases, the software for many of these functions is substantially identical. Uniformity in software between the field controllers is useful because it allows for ease of upgrades in functionality to be propagated to all field controllers, and because it allows for predictability in interactions between the various field controllers.

The computer workstation 118 includes software operable to carry out various supervisory functions 119 related to the building control system 100. The computer workstation 118 in its supervisory functions 119 serves as a centralized interface for human technicians. While the field controllers 112, 114 and 116 may contain interface equipment that allows for certain localized interaction with technicians, the supervisory functions 119 of the workstation 118 provides a single location at which alarm conditions, system status, and system-wide measurements may be viewed, and from which set points may be viewed and/or altered. The workstation 118 is preferably configured as a general purpose computer, and includes a keyboard, display screen, a processor motherboard, hard drive and one or more expansion cards enabling communications on the building network 120. The building control system functionality is generated in software that resides on a general purpose operating system such as Windows NT.™., Windows XP.™., both trademarks of Microsoft Corporation of Redmond, Wash. Other suitable operating systems include UNIX-based operating systems, Linux-based operating systems, and MAC OS X available from Apple Computers.

Figure 1A:
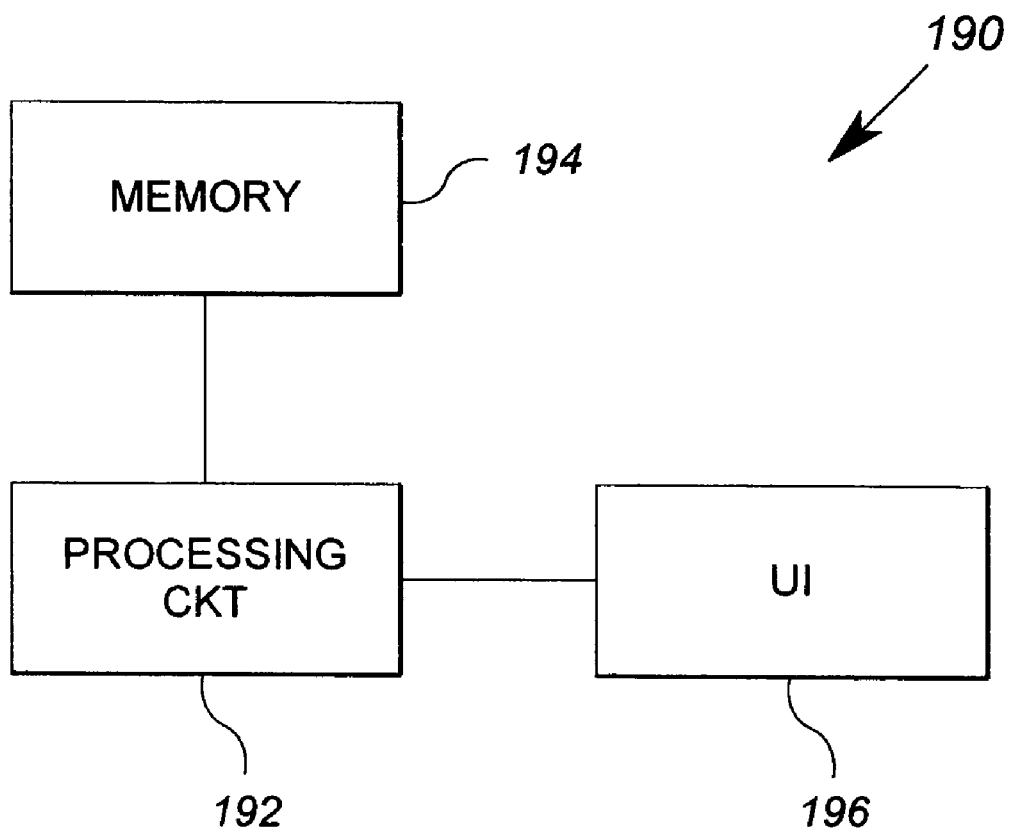
FIG. 1a shows an exemplary workstation of the system of FIG. 1.

Although such devices are well known in the art, FIG. 1a shows a simplified block diagram exemplary embodiment of a general purpose computer 190 that may be used as the workstation 118. The general purpose computer includes a processing circuit 192, memory 194, and a user interface 196. The processing circuit 192 contains one or more microprocessors or similar processing devices, as well as all of the "glue" logic and circuitry that allows the microprocessor to function properly to carry out the instructions attributed to the workstation 118 described herein. The processing circuit 192 preferably further includes communication circuitry operable to communicate on one or more networks, such as the building network 120 of FIG. 1. The memory 194 stores the instruction that are executed by the processing circuit 192 and may include any combination one or more of the following: RAM, ROM, CD-Rom disks, floppy drive disks, hard drive disks, DVD-Rom disks, flash memory, and other memory devices commonly used in a general purpose computer. The user interface 196 typically includes a keyboard, a pointing device (e.g. a mouse) and a display of some type, and may include audio capabilities.

Referring again to FIG. 1, it will be appreciated that in an ordinary large commercial or industrial building, the building control system 100 may include dozens of field controllers, and more than one computer workstation. The use of multiple workstations allows for centralized supervisory control and monitoring of a system from multiple locations. However, the general configuration is that a building control system will have many more field controllers than workstations.

In accordance with aspects of the present invention, the workstation 118 further includes software operable to perform many of the functions of the field controllers 112, 114 and 116. This software forms a virtual field controller 121 that has an identity within the workstation 118 apart from the normal supervisory function 119 and monitoring capabilities of the workstation 118.

More specifically, the virtual field controller 121 preferably includes at least some of the applications of the field controllers 112, 114 and 116. Furthermore, the software for those applications should be derived from substantially similar source code. However, instead of utilizing a specialized field panel platform, the virtual field panel 121 operates in the environment of a general purpose computer with a general purpose operating system. To this end, the virtual field panel 121 preferably includes at least one shared software piece 122 and an operating system abstraction layer 124.

The shared software piece 122 includes software compiled from substantially identical source code as that used for corresponding applications in the field controllers 112, 114 and 116. The shared software piece 122 may include the same data management function, control application functions, and/or advanced services application functions as those installed on the field controllers 112, 114 and 116. One advantage of the virtual field controller is that it may be used to test new advanced service applications, and/or demonstrate the operation of new features, without requiring physical access to a working field controller.

The operating system abstraction layer 124 provides a platform independent interface to operation system resources that allow the field controller applications to operate in a general purpose computer environment. Ordinarily, the physical field controller firmware is designed for a different operating system that is better suited to the specific needs of the physical field controller device. In particular, physical field controllers 112, 114 and 116 typically use a real-time operating system intended primarily for use for embedded controller devices. One such operating system is the Nucleus operating system available from Mentor Graphics, from www.mentor.com. By providing the abstraction layer 124, the virtual field controller 121 may use the same (or substantially the same) software upgrades and adjustments as those installed on the field controllers 112, 114 and 116, even through they use different operating systems.

In operation, building control system field controllers and supervisory workstations operate to help maintain some aspect of building operation. In the simplified example of FIG. 1, the field controllers 112, 114 and 116 cooperate with each other and the supervisory workstation 118 to maintain a desired or comfortable temperature in areas of the building 200 of FIG. 2.

In general, the field controller 112 receives sensor inputs from the sensors 132 and 134 that are indicative of temperature at the two zones 202 and 204 of the building. The field controller 112 determines whether there is a need for additional cool air into the zones 202 and/or 204 based on whether the sensed temperature in either zone exceeds a set point by a predetermined amount. The field controller 112 also determines whether there is a need to reduce the amount of cool air into the zones 202 and/or 204 based on whether the set point exceeds the sensed temperature by a predetermined amount. To this end, the field controller 112 executes control software that uses control algorithms to determine whether to open or close (and if so, to what degree) the ventilation dampers 212 and/or 214 connected respectively to damper actuators 136 and/or 138. Such control algorithms utilized measured temperature and set point information to determine an actuator signal as is known in the art. One suitable algorithm is known as a proportion-integral-differential ("PID") control algorithm.

The field controller 112 may further execute advanced services, such as statistical trending of temperature data from either or both of the temperature sensors 132 and 134. Trending can provide a statistical and historical view of how temperature fluctuates in those zones 202 and/or 204 of the building. Trending may alternatively track the control output values generated for the damper actuators 136 and/or 138. Various trending operations and their usefulness are known in the art. Other advanced services may include a scheduler operation that alters some aspect of field controller operation based on the time of day, time of year, or even time of week. For example, a scheduler may alter the temperature set point for weekends and evenings to conserve energy.

The field controller 112 may receive its set point information from the computer workstation 118. To this end, a technician may enter a system-wide temperature set point at the workstation 118 that is used by all field controllers that control temperature. This set point is communicated to the field controllers 112 and 114 via the building control network 120.

Another advanced service provided by the field controller 112 is alarming. If a temperature from the sensors 132 or 134 fall outside an acceptable range from the set point, then the field controller 112 may generate an alarm event. The field controller 112 includes a service by which other field controllers (field controllers 114, 116 and virtual field controller 121) and the supervisory function 119 may subscribe to receive alarm notifications. In general, the supervisory function 119 of the workstation 118 will subscribe to most alarms that require intervention. Otherwise, it would be necessary for the technician to review one or more physical field controller for alarm conditions.

The field controller 114 preferably operates in a similar manner to control actuators 146 and/or 148 to open or close corresponding ventilation dampers 216, 218 based on a temperature set point and sensor values from the sensors 142 and/or 144. The field controller 114 can similarly run advanced services including trending, alarming and scheduling.

The field controller 116 also includes substantially the same function/software suite as the field controllers 112 and 114, but is configured to control the operation of a blower motor 152. The blower motor 152 may be controlled to increase or decrease the overall flow of cool (or warm) air into the ventilation shaft 210. Thus, for example, if the cool air flow was not sufficient to bring the temperature detected by the sensors 132, 134 142 and 144 within range, then the blow motor 152 may be adjusted to increase the overall flow through the shaft 210. In another example, if the temperature in all the zones of the building is adequate while all of the ventilation dampers are 90% closed, then it may be advisable to adjust the motor 152 to reduce the overall flow in the shaft 210 to increase energy efficiency in the building 200. In other words, if the ventilation dampers are uniformly closed, then energy efficiency is served by opening the dampers 212, 214, 216 and 218 a little further and reducing the overall air flow in the shaft 210.

To control the air flow in this manner, the field controller 116 may suitably receive input from the flow sensor 154, input from the temperature sensors 132, 134, 142 and/or 144, and possibly the control values used to control the actuators 136, 138, 146 and/or 148. The sensor and actuator values would be communicated from the field controllers 112 and 114 via the building network 120. It is noted that sensor values, actuator values, and set points may be referred to herein as "points" or "point values". A point is a device or variable in the HVAC system. Each of the field controllers 112, 114 and 116 receives and generates point values. Thus, the field controller 116 may receive point values that originated at other field controllers and use those values to control the blower motor 152.

In general, the operations of the field controllers 112, 114 and 116 described above are typical of currently available, sophisticated building control system field controllers. Physical field controllers in available systems provide localized control and are typically located proximate to the devices they control, and/or to the sensors from which they receive information.

In accordance with some embodiments of the invention, however, the virtual field controller 121 of the workstation 118 also operates to perform one or more field controller operations, such as alarming, scheduling or trending. In the embodiment described herein, the virtual field controller 121 does not directly connect to sensors or actuators, but rather performs operations on point values obtained from one or more of the other field controllers 112, 114 or 116. Preferably, the virtual field controller 121 operates as a separate logical entity on the building network 120 that is distinct from the supervisory function 119 of the workstation 118. This can be accomplished by allocating a separate TCP/IP port on the workstation 118 that is specifically allocated to the virtual field controller 121. Another TCP/IP port is used for the supervisory function 119 of the workstation 118.

Figure 3:
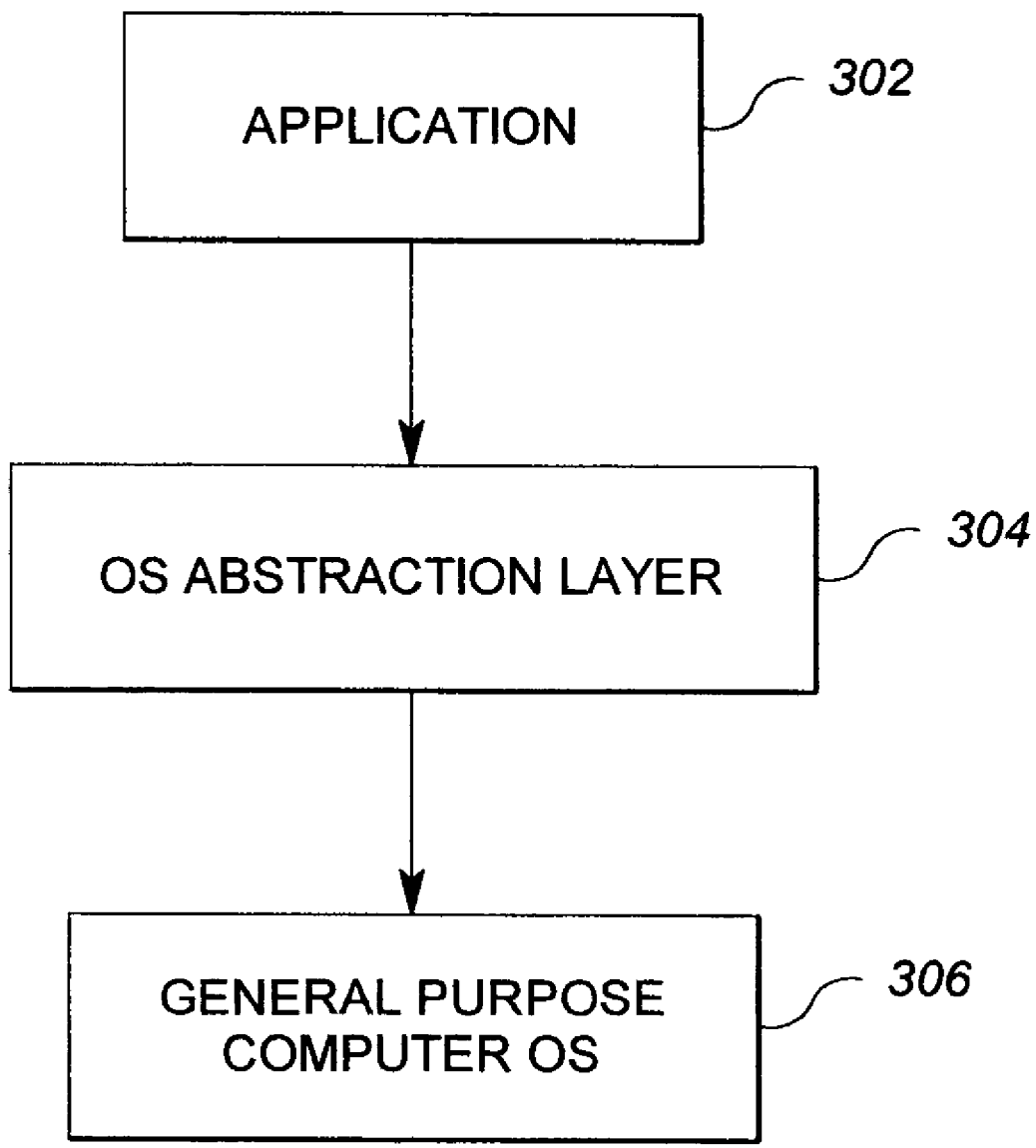
FIG. 3 shows a functional block diagram of an exemplary software architecture of the work station that incorporates a virtual field controller according to the present invention.

FIG. 3 shows a diagram of a structure that allows for portability of the source code of the field controllers 112, 114 and 116 to the workstation 118 to enable the virtual field controller 121. In general, in a preferred embodiment, each of the field controllers 112, 114 and 116 uses the same software for many if not all of the applications present therein. Differences in functionality of the field controllers 112, 114 and 116 may be achieved by disabling and enabling select applications, and by configuring the control application to accept the inputs and generate the outputs required for the panel's implementation. However, the core of most executable applications is substantially identical. In accordance with some embodiments of the invention, at least some of the same applications are to be implemented in the virtual field controller 121 of the workstation 118 using a substantial amount of the same code. However, while the field controllers 112, 114 and 116 have hardware and operating system arrangements specially configured for building system field controller purposes, the general purpose computer workstation 118 has a different physical platform and operating system.

As discussed above, in order to import application software to the workstation 118, each application 302 from the field controller source code interacts with an abstraction layer 304 (i.e. layer 124 of FIG. 1), which handles machine/OS specific interactions. In particular, at least some of the physical field controller source code will contain operating system calls which are not directly compatible with the general purpose operating system 306 of the workstation 118. The abstraction layer 304 is designed to receive these calls and translate or conform the calls to the operating system 306 of the workstation 118, which in the example described herein is a 32 bit WINDOWS-based operating system such as Windows XP or the like. As will be discussed below, even with the abstraction layer 304 there maybe portions of the field controller application source code that will require modification to achieve compatibility with the operating system 306. However, the goal is to reduce the need for such modification.

The exact nature of the abstraction layer 304 will depend on the structure of the applications employed by the field controllers 112, 114 and 116. Those of ordinary skill in the art would be able to develop a suitable abstraction layer 304 by determining the machine specific calls such as operating system calls, and pragmas, and determining how to accommodate those calls in the general purpose operating system of the workstation 118. Further detail regarding methods for generating an abstraction layer such as the layer 304 is provided below in connection with FIG. 5.

Figure 4:
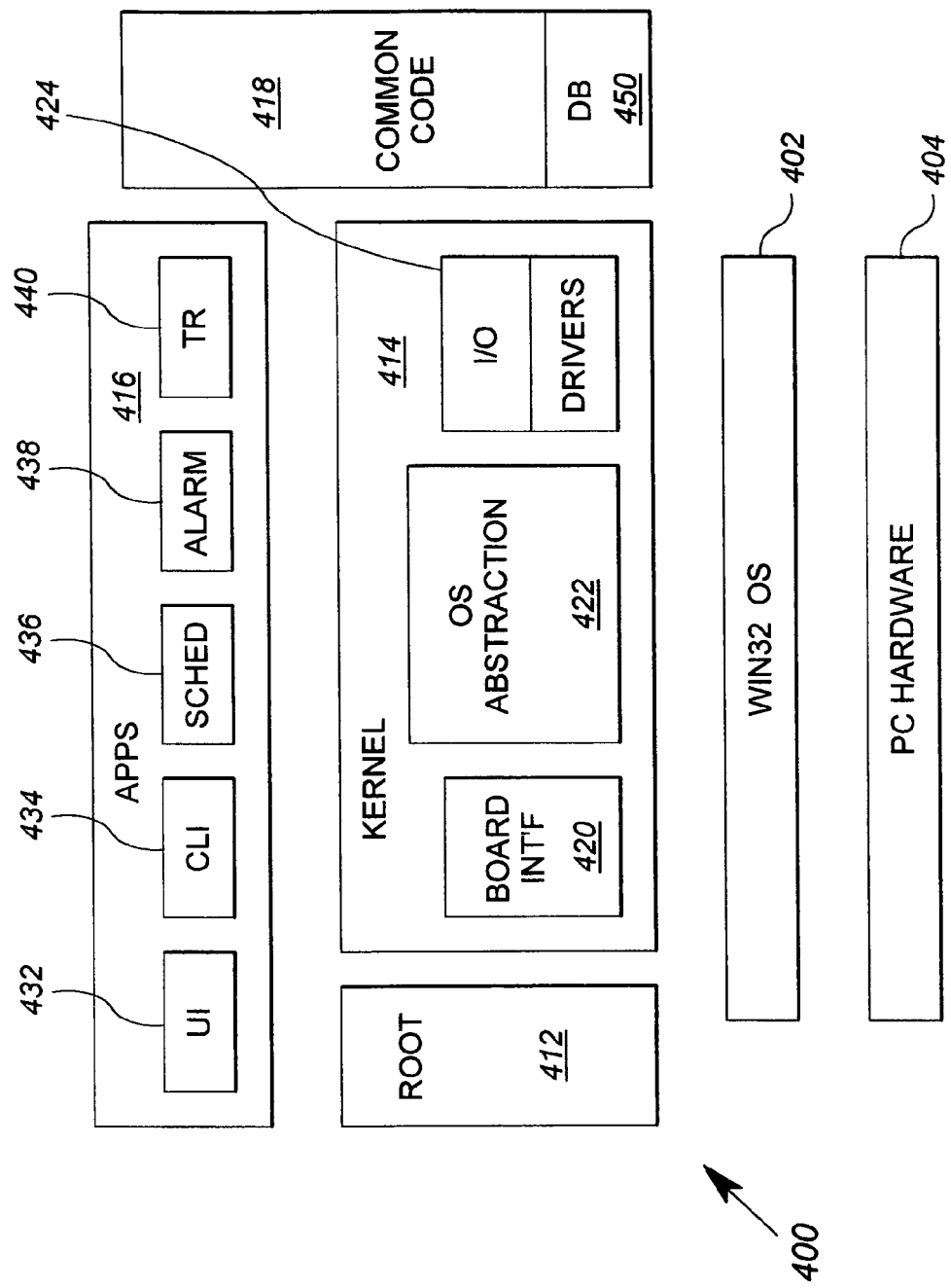
FIG. 4 shows in further detail an exemplary virtual field controller according to the invention implemented in a computer workstation.

FIG. 4 shows a block diagram of the operations of a virtual field controller according to the invention. It should be noted that the exact configuration of field controllers in different systems will differ and the virtual field controller of FIG. 4 is given by way of example only. The example discussed below illustrates how standard physical field controller functions may be imported to the general purpose computer/general operating system platform. Thus, the types of operations and their translation from the physical field controller (i.e. controllers 112, 114, or 116 of FIG. 1) to the virtual field controller (i.e. the controller 121 of FIG. 1) may vary from system to system, but the idea is that many of those functions are replicated, preferably with substantial software code re-use, on the general platform.

Referring now to FIG. 4, the virtual field controller 400 is shown configured for use in a WINDOWS.®. 32 bit platform. The virtual field controller 400 may suitably be used as the virtual field controller 121 of FIG. 1. The platform includes a Win32 operating system 402 and PC hardware 404. The operating system 402 and the PC hardware 404 may suitably be used as the PC hardware 404 may suitably a general purpose computer such as those that include an Intel Pentium.®. or compatible microprocessor, at least 733 MHz processor clock speed, at least 2 GB of harddrive space, at least 256 MB of RAM, a monitor, keyboard, communication ports and the like. Such general purpose computers are well known and widely available. Such requirements will increase as time passes and software is enhanced.

The virtual field controller 400 includes a root process 412, a kernel 414, a set of applications 416, and common code 418. A brief description of each element and how it differs from the corresponding process in a physical field controller is provided. Those of ordinary skill in the art may readily implement the elements as described, particularly when converting existing field controller firmware for use in the virtual field controller 400.

The root task 412 is a task that initializes the kernel 414, and starts up other tasks that provide contexts for the applications 416 and for support services such as a database manager and a network manager. The root task uses the main( ) function, which is the standard C/C++ process entry point. It will be noted that the term "task" as used herein is the same as a "thread" in the terminology of a 32 bit Windows operating system.

It will be appreciated that in the physical field controller, such as the controller 114 of FIG. 1, the root task further has the responsibility to boot up all of the processing elements of the controller 114. These processing elements include the devices interrupt handlers and other system resources. In the virtual field controller 400, the root process 412 is not responsible for these procedures because they are handled by the Win32 operating system 402. Accordingly, translation of the physical field controller root process to the virtual field controller root process 412 results in a simplification of the code.

The kernel 414 is the main executable file for the virtual field controller 400. The kernel 414 has three main components, including a board interface 420, an operating system abstraction layer 422 and an I/O interface 424. The interfaces 420 and 424 should appear to external devices/processes substantially the same as they would in the physical field controller. In other words, an application from the set of applications 416 that makes an I/O call, or requests information from the board interface 420, should receive the substantially a response similar in type and form as that received by an application in the physical field controller.

The board interface 420 provides information regarding the "virtual" board configuration. Such information in a physical field controller may include location information, system logical location information, software or firmware revision number, and the like. For the embodiment described herein, the board interface 420 in the virtual field controller 400 should at least include a revision value for the firmware/software. Preferably, the revision value should follow the same revision path to that of the physical field controllers' firmware. One of the advantages of embodiments of the present invention is that the revisions to the firmware of the physical field controllers track to the software of the virtual field controller 400. Many other values of the physical field controller board interface, such as cold start history, Ethernet settings, and serial port settings, do not apply to the virtual field controller, and thus may be set to null or not used.

However, it is noted that the virtual field controller 400 connects to the building network using the Ethernet connectivity of the PC hardware 404. The Ethernet configuration of the PC hardware 404 and Win32 operating system 402 provides the means by which the virtual field controller 400 communicates over the building network (i.e. the building network 120 of FIG. 1). The virtual field controller 400 obtains an Ethernet port number that is not shared by the supervisory function of the host PC hardware 404. It is noted that multiple virtual field controllers such as the field controller 400 may reside on the same PC hardware 404 using this configuration. In such a case, each virtual field controller would have its own port number.

Such Ethernet information is not stored in the board configuration, but rather constitutes a part of the OS abstraction layer 422. The OS abstraction layer 422 accesses TCP/IP services form the Ethernet network using Winsock, which is part of the Win32 operating system 404.

Referring now specifically to the abstraction layer 422, it will be appreciated that the OS abstraction layer 422 is a specially configured process that provides a platform-independent API for operating system services and kernel objects. In particular, the kernel 420, which is preferably derived from much of the same source code as the kernel in the physical field controller, will contain calls to operation system services and objects. During operation, the OS abstraction layer 422 receives those calls and formulates corresponding calls the Win32 operating system 402.

Figure 5:
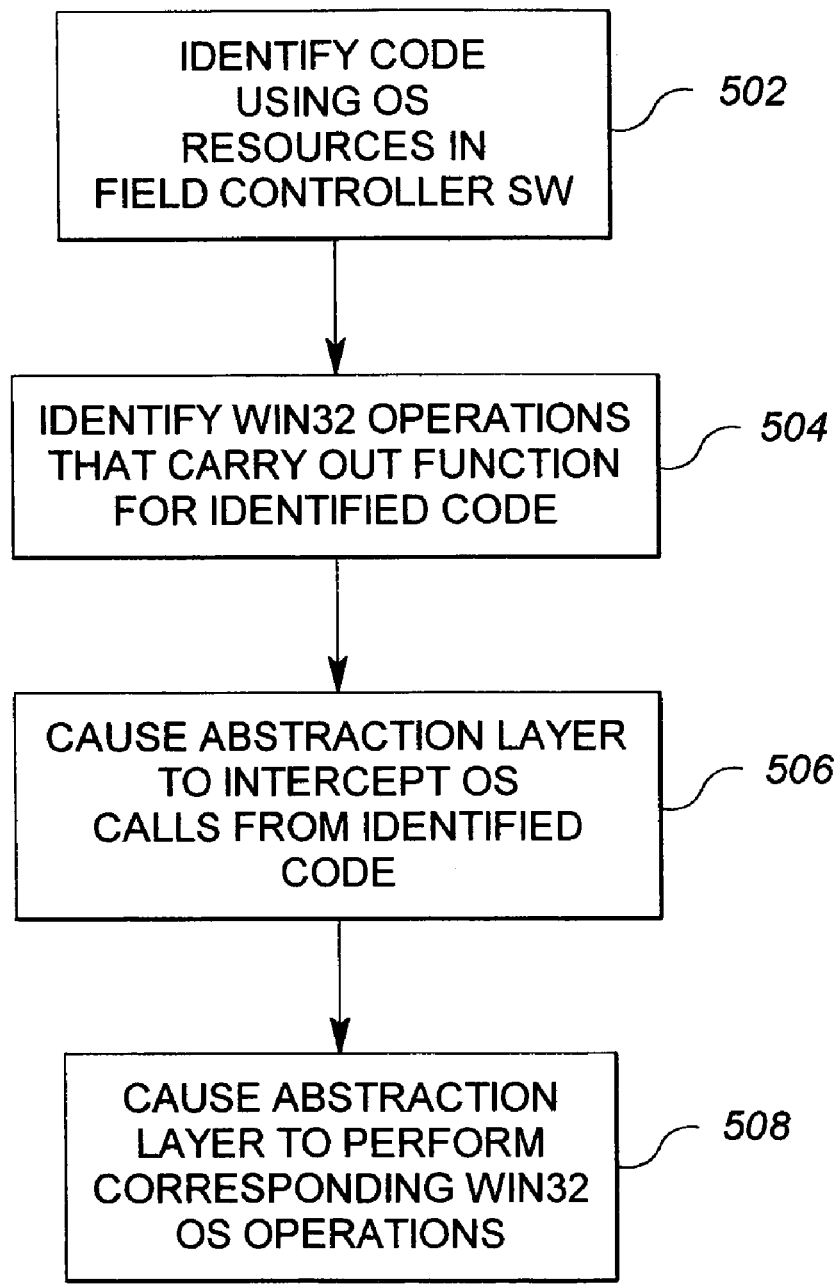
FIG. 5 shows a flow diagram of an exemplary set of operations that may be used to implement an operating system abstraction layer of the virtual field controller of FIG. 4.

As discussed above, those of ordinary skill in the art may readily device a suitable OS abstraction layer 422 for their particular implementation. To this end, FIG. 5 shows a flow diagram of steps that may be taken to generate the OS abstraction layer. One step is to examine the physical field controller source code and determining where operating system resources are implicated (step 502). This may be done manually or at least partially by an automated procedure that parses the code for character strings relating to OS calls. Once the physical field controller source code relating to OS calls is identified, a piece of code that utilizes corresponding Win32 operating system resources is identified (step 504). Again, this may be done by hand, or in conjunction with an automated procedure that includes a translation mechanism or look-up table. Next, the OS abstraction layer 422 and/or the original source code is modified to have the OS abstraction layer 422 intercept such OS calls (step 506). The OS abstraction layer 422 is then programmed to perform the corresponding Win32 operating system call upon receipt of the source code OS call (step 508). It will be apparent that several variants of the above process may be used to develop the OS abstraction layer 422. The precise method of developing the OS abstraction layer 422 is not critical to obtaining many of the benefits of the invention.

Referring again to FIG. 4 and the discussion of the kernel 414, the I/O interface 424 in the embodiment described herein consists of device drivers and an application I/O class. The device drivers contain in the ordinary physical field controller may include those relating to external communications (via a Telnet interface), specialized types of network connections (i.e. low level device networks), actual sensors and actuator devices, and the like. In the embodiment described herein, the individual I/O devices for actuators and sensors are not included with the virtual field controller 400 and therefore the device drivers for those elements is not necessary. Thus, the device drivers may suitably only provide the protocols necessary for Telnet and/or other network drivers. However, in other embodiments, it may be preferable to include an expansion board in the PC hardware 404 that allows direct connection to actuators or sensors.

In the embodiment described herein the application I/O class is used by the applications of the set of applications 416 to pass I/O requests to the device drivers, and by the device drivers to pass I/O responses up to the applications. Unfortunately, the application I/O class will tend to differ significantly from operating system to operating system and thus may require substantial rewriting for the virtual field controller 400. However, it is important that the application I/O class be substantially "black box" identical in both the physical and virtual field controllers.

The set of applications 416 consist of the actual field controller applications that will be available on the virtual field controller 400. While one advantage of the virtual field controller 400 is that it allows field controller applications to run without the need for the physical field controller hardware, not all of the physical field controller applications need be included in the set of applications 406 of the virtual field controller 400.

In the embodiment described herein, the set of applications 416 includes, among other things, a user interface ("UI") application 432, a control language interpreter 434, an equipment scheduler 436, an alarm manager 438 and a trending program 440. It is noted that the virtual field controller 400 includes a point database 450 that constitutes supports creating, storing and commanding of points (e.g. sensor values, actuator values, set point values, etc.). As discussed further above in connection with FIG. 1, each physical field controller maintains a number of points, and the virtual field controller 400 is no different. Although the field controller 400 does not directly connect to physical actuators and sensors in the embodiment described herein, the virtual field controller 400 may obtain points for select actuators and sensors obtained by other physical field controllers via the building network.

The user interface ("UI") program 432 in the embodiment described herein consists of a UI server that is accessible through Telnet. The UI server of the physical field controller is capable of providing information displayable on a normal general purpose computer, and receiving input from the general purpose computer, using a Telnet link. This capability is common to many types of commercially available field controllers, including the MEC available from the Siemens Building Technologies, Inc. The information provided for display may include all user interaction with the field controller, including configuration and usage of other applications, etc. The UI interface program 432 therefore may be substantially similar to its physical field controller counterpart because the information provided is similar and because both physical and virtual field controllers contain a Telnet server. The UT program 432 may be used to allow the virtual field controller 400 to register for points or alarms from other physical (or virtual) field controllers.

The control language interpreter 434 is a program that allows for the definition of control algorithms, which is a fundamental part of a building control system. The control language interpreter allows a user to define inputs (e.g. temperature point values), and outputs (e.g. ventilation damper actuator values), and parameters of the control algorithm (hysteresis, damping, etc.). The control language interpreter 434 then carries out the control algorithms during day to day operation using the defined inputs, defined outputs, and any associated set point values. The code for the control language interpreter 434 should be substantially similar to its physical field controller counterpart.

The equipment scheduler 436 is an application that allows for changes in various points or parameters of other applications (such as control programs generated by the control language interpreter 434) based on time and/or date information. Various operations may be modified based on the season, or the time of day. Equipment scheduling functions are known in the art. The code for the equipment scheduler 436 should be substantially similar to its physical field controller counterpart.

The alarm manager 438 provides an application in which points are monitored against thresholds to determine if a point value is outside an acceptable or desirable threshold window. When a particular point exceeds its defined thresholds, an alarm event is created. The alarm event is forwarded, via the building network, to any node on the network (field controllers, supervisory control stations) that requests notification of alarm events for that point. Technicians may define alarm thresholds using the UI program 432. The code for the alarm manager 438 should be substantially similar to its physical field controller counterpart.

The trending function 440 performs statistical operations for select points as defined by the user. Again, the selection of points to trend and the parameters of the trending operation may be received from the user via the UI program 432. Trending functions are known in the art. The code for the trending function 440 should be substantially similar to its physical field controller counterpart.

The common code 418 portion of the virtual field controller includes the general purpose functions or classes, for example, those relating to string manipulation and those relating to data structures. The common code 418 should be substantially similar to its physical field controller counterpart.

Various implementation details of the virtual field controller 400 will be readily apparent to those of ordinary skill in the art. Some detail relating to a particular implementation is included in the U.S. provisional patent application Ser. No. 60/540,544, filed Jan. 30, 2004, upon which this application claims priority and which is incorporated herein by reference.

Some advantages of a virtual field controller 400 described above arise from the fact that significant portions are generated from source code that is similar to corresponding portions of the source code used for the physical field controllers. These advantages include the ability to test new functionality without requiring access to a physical field controller. The individual software elements described above that have similar code elements may be originally as library function (e.g. .lib files) that get compiled into the main thread. However, other methods of incorporating such elements may be used.

Another advantage of the virtual field controller 400 is the ability to use the advanced applications, for example, scheduling, trending, etc. for points maintained by more rudimentary physical field controllers. In particular, some systems employ older or less expensive field controllers that do not have the ability to perform advanced functions, but may nevertheless convey point information over a building network. The virtual field controller 400 may be used to perform advanced application functions on the data gathered by such rudimentary field controllers. To this end, one of the applications of the virtual field controller 400 may be a mapping function that maps point values from one type of field controller to the standard for the building system 100. The virtual field controller 400 may then perform trending, advanced alarming, scheduling and other functions on those points.

Another possible advantage provided by the above described embodiment is the ability to use the virtual field controller 400 as a training tool to teach users how to operate the physical field controllers. For example, training for writing control programs may be effected on the virtual field controller 400 because the control language interpreter 434 of the virtual field controller 400 is substantially similar to the control language interpreter of the physical field controllers. Training for other applications have similar advantages.

Other advantages include advantages relating to sales and marketing. The functions of the corresponding physical field controller may be demonstrated using software on any general purpose computer, such as a laptop (portable) computer. The virtual field controller executing on a portable computer eliminates the need to obtain and configure a physical field controller in order to demonstrate the functionality of the corresponding field controllers.

It will be appreciated that the above described embodiments are merely exemplary, and that those of ordinary skill in the art may readily devise their own modifications and implementations that incorporate the principles of the present invention and fall within the spirit and scope thereof. It will be noted, for example, that some physical field controllers in a building control system may not generate actuator control values, or may not be connected directly to an actuator or a sensor. However, most systems include at least one field controller that is operably connected to either a sensor or an actuator, and which generates actuator control values.

What is claimed is:

1. An arrangement comprising a general purpose computer having a memory and processing circuit, the general purpose computer configured to execute programming instructions in the memory, the memory configured to store instructions operable to cause the processing circuit to:
    execute a first operating system;
    execute software compiled from a set of instructions that are substantially similar to instructions used to compile firmware for a physical field controller of a building control system; and
    execute an operating system abstraction layer, the operating system abstraction layer configured to cause operating system calls in the set of instructions configured for a second operating system of the physical field controller to be made in a manner that is compatible with the first operating system.

2. The arrangement of claim 1, wherein the set of instructions includes a control program.

3. The arrangement of claim 2, wherein the control program includes a common control function programming environment operable to receive instructions in a common control function programming language, and execute a control function program created in the control function programming language.

4. The arrangement of claim 1, wherein the set of instructions includes those capable of carrying out an alarm function in the building control system.

5. The arrangement of claim 1, wherein the set of instructions includes those capable of carrying out a data trending function in the building control system.

6. The arrangement of claim 1, wherein the set of instructions includes those capable of carrying out an equipment scheduling function in the building control system.

7. The arrangement of claim 1, wherein the first operating system is a general purpose operating system and wherein the second operating system is an operating system configured for use with an embedded controller.

8. The arrangement of claim 1, wherein the memory is configured to store instructions operable to cause the processing circuit to perform supervisory data functions with regard to data stored on a plurality of physical field controllers.

9. An arrangement comprising a control station for use in a building control system, the building control system having a plurality of field panels operable to communicate with the control station, the control station having a memory and processing circuit configured to execute programming instructions in the memory, the memory configured to store instructions operable to cause the processing circuit to:
    execute a first operating system;
    execute software compiled from a set of instructions that are substantially similar to instructions used to compile firmware for at least one of the field panels; and
    execute an operating system abstraction layer, the operating system abstraction layer configured to cause operating system calls in the set of instructions configured for a second operating system of the field panel to be made in a manner that is compatible with the first operating system.

10. The arrangement of claim 9, wherein the set of instructions includes those capable of providing a common control function programming environment operable to receive instructions in a common control function programming language, and to execute a control function program created in the control function programming language.

11. The arrangement of claim 9, wherein the set of instructions includes those capable of carrying out an alarm function in the building control system.

12. The arrangement of claim 9, wherein the set of instructions includes those capable of carrying out a data trending function in the building control system.

13. The arrangement of claim 9, wherein the set of instructions includes those capable of carrying out an equipment scheduling function in the building control system.

14. The arrangement of claim 9, wherein the first operating system is a general purpose operating system and wherein the second operating system is an operating system configured for use with an embedded controller.

15. The arrangement of claim 9, wherein the memory is configured to store instructions operable to cause the processing circuit to perform supervisory data functions with regard to data stored on a plurality of physical field controllers.

16. An arrangement comprising a control station for use in a building control system, the building control system having a plurality of field panels operable to communicate with the control station, the control station having a memory and processing circuit configured to execute programming instructions in the memory, the memory configured to store instructions operable to cause the processing circuit to:
    execute a first operating system;
    execute software compiled from a set of instructions that are substantially similar to instructions used to compile firmware for at least one of the field panels, the at least one field panel employing a second operating system; and
    execute software performing at least one supervisory control operation for the plurality of field panels.

17. The arrangement of claim 16, wherein the at least one supervisory control operation includes a supervisory control function operation that is outside a set of operations which the plurality of field panels are configured to perform.

18. The arrangement of claim 16, wherein the at least one supervisory control operation includes a supervisory control function operation that obtains alarm notifications generated by devices coupled to a plurality of field panels.

19. The arrangement of claim 16, wherein the set of instructions includes those capable of providing a common control function programming environment operable to receive instructions in a common control function programming language, and to execute a control function program created in the control function programming language.

20. The arrangement of claim 16, wherein the set of instructions includes those capable of carrying out an equipment scheduling function in the building control system.

21. The arrangement of claim 16, wherein the first operating system is a general purpose operating system and wherein the second operating system is an operating system configured for use with an embedded controller.

22. The arrangement of claim 16, wherein the at least one supervisory control operation includes an operation performing supervisory data functions with regard to data stored on a plurality of physical field controllers.

* * * * *